June 20, 1933.  E. F. REINHARDT  1,914,649
TOASTER
Filed Oct. 21, 1929  4 Sheets-Sheet 1
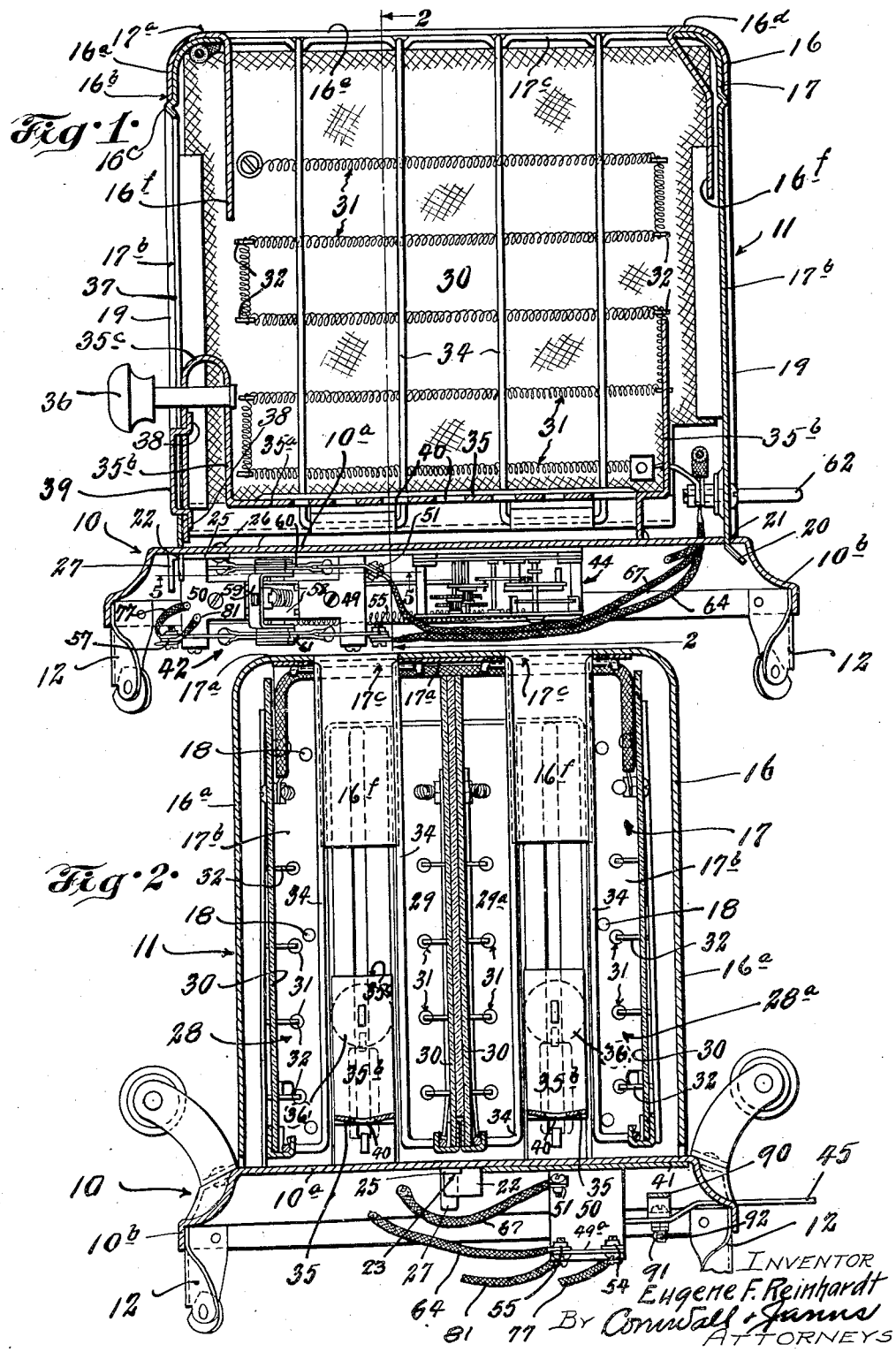

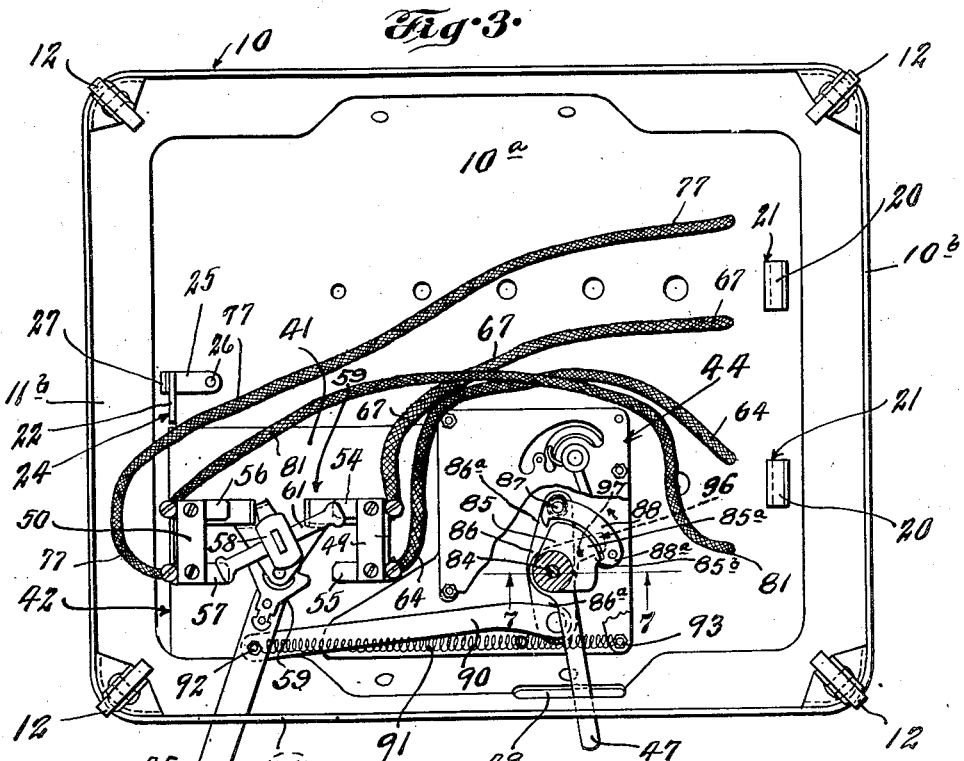
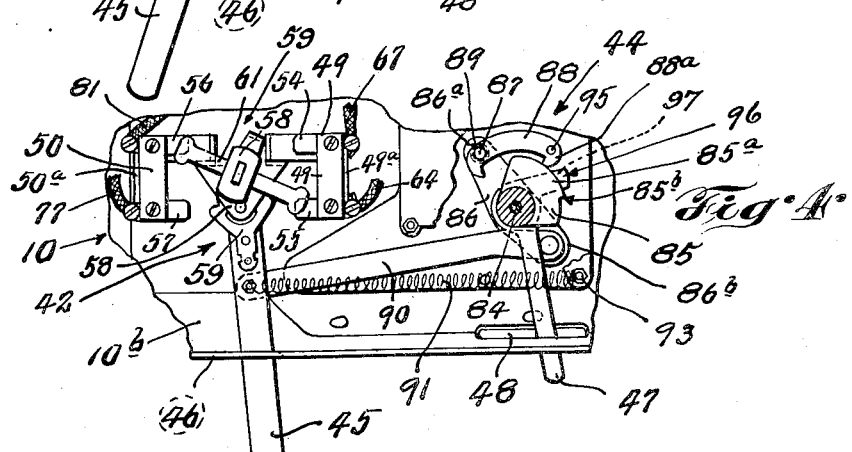
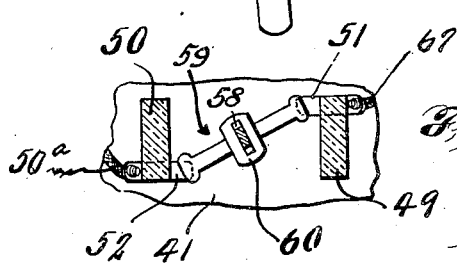

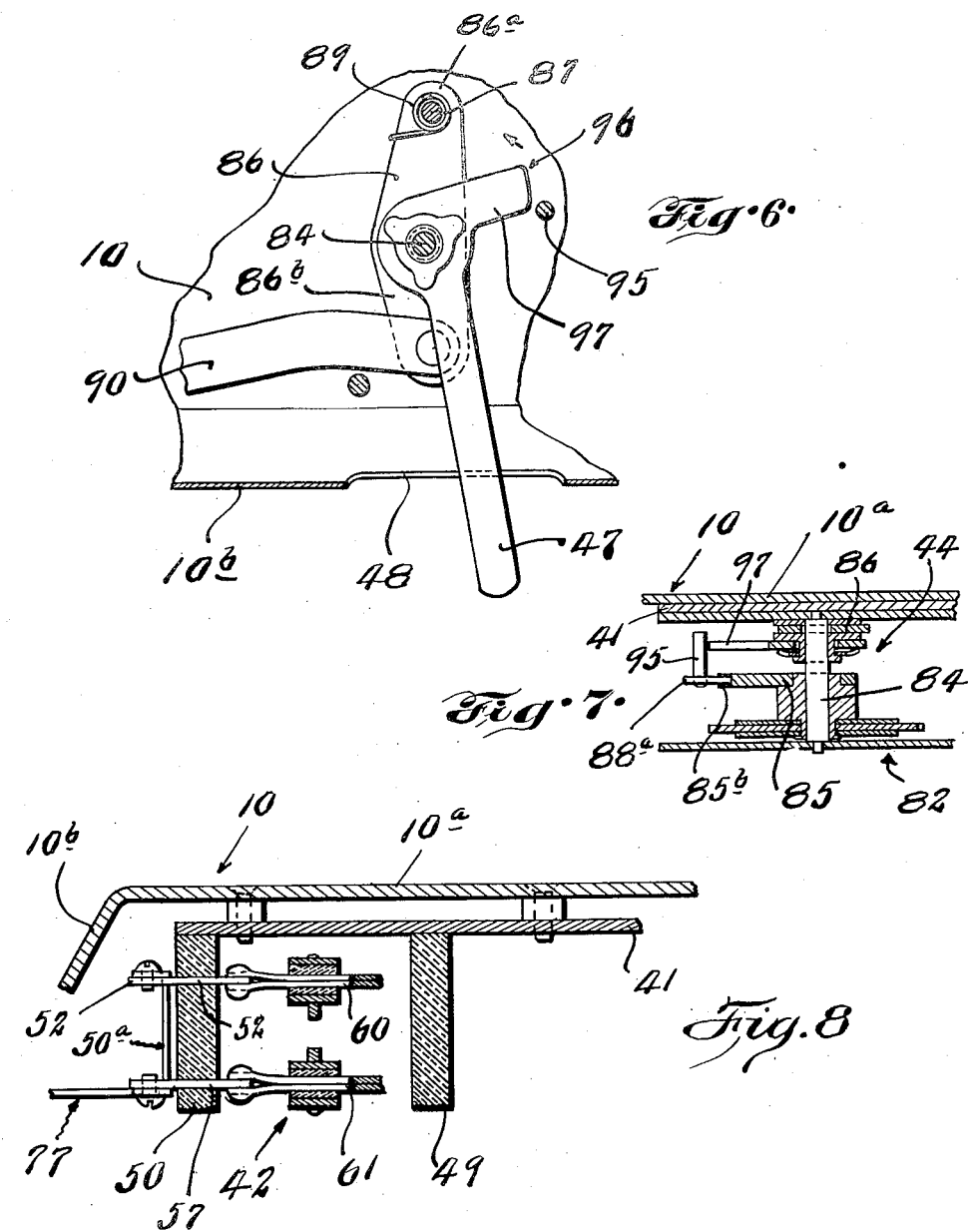

INVENTOR
Eugene F. Reinhardt

Patented June 20, 1933

1,914,649

UNITED STATES PATENT OFFICE

EUGENE F. REINHARDT, OF ST. LOUIS, MISSOURI, ASSIGNOR TO JOSEPH PAVELKA, OF ST. LOUIS, MISSOURI

TOASTER

Application filed October 21, 1929. Serial No. 401,224.

This invention relates to new and useful improvements in electric toasters.

The primary objects of the invention are to provide an electric toaster having a plurality of heating elements or grids adapted to be connected to receive electric current of full strength during the toasting operation and to receive electric current of reduced strength after the toasting operation is completed, whereby the toaster retains a suitable degree of temperature after the toasting operation to hold the toast in readiness for the next toasting operation.

Other objects of the invention are to provide a toaster having a plurality of heating elements or grids connected to the supply lines in parallel with each other during the toasting operation to furnish high heat and adapted to be connected in series with each other immediately after the toasting operation is completed in order to provide low heat for maintaining the toaster in readiness for another toasting operation and for keeping the toast warm and crisp without danger of scorching or burning the toast.

Further objects of the invention are to provide an electric toaster having a plurality of oppositely disposed heating elements or grids and a switch for connecting said elements or grids in parallel with each other during the toasting operation, thereby providing the necessary high or toasting heat and for connecting said elements or grids in series with each other after the toasting operation, thereby providing a suitable degree of low heat so that the finished toast can be retained in the toaster and kept warm and crisp thereby until ready to serve.

Still further objects of the invention are to provide an electric toaster having a plurality of heating elements or grids and a switch for connecting said elements with the main lines in parallel with each other during the toasting operation, thereby supplying said grids with electric current of proper strength to furnish high toasting heat, and for connecting said elements or grids in series with each other after the toasting operation, thereby furnishing said grids with reduced electric current suitable for maintaining the toaster warm and the toast contained therein crisp; and to provide a time mechanism for actuating said switch whereby the switch is manually operated to connect said grids in parallel with each other for the toasting operation and is automatically operated after a predetermined period of time to connect said grids in series with each other and reduce the heat of the grids to a sufficient degree to prevent burning or scorching of the toast.

Additional objects of the invention are to provide a switch mechanism manually operable in one direction and automatically operable in the other direction, said switch having a plurality of contacts and contact arms adapted upon the manual operation of the switch to connect the heating elements or grids in parallel with each other and upon the automatic operation to connect the grids in series with each other.

With these and other objects in view, my invention consists in certain novel features of construction and arrangement of parts, hereinafter more fully described and claimed, and illustrated in the accompanying drawings, in which—

Figure 1 is a vertical cross section taken longitudinally through the toaster.

Figure 2 is a vertical section taken on line 2—2 of Figure 1.

Figure 3 is a plan view looking against the underside of the base of the toaster with parts broken away, better to illustrate the invention.

Figure 4 is a similar view, partly broken away, and showing the switch mechanism in position.

Figure 5 is a section taken on line 5—5 of Figure 1.

Figure 6 is an enlarged detail view of the timing mechanism.

Figure 7 is a vertical cross section taken on line 7—7 of Figure 3.

Figure 8 is a perspective detail view of the switch and the contacts thereof.

Figure 9:
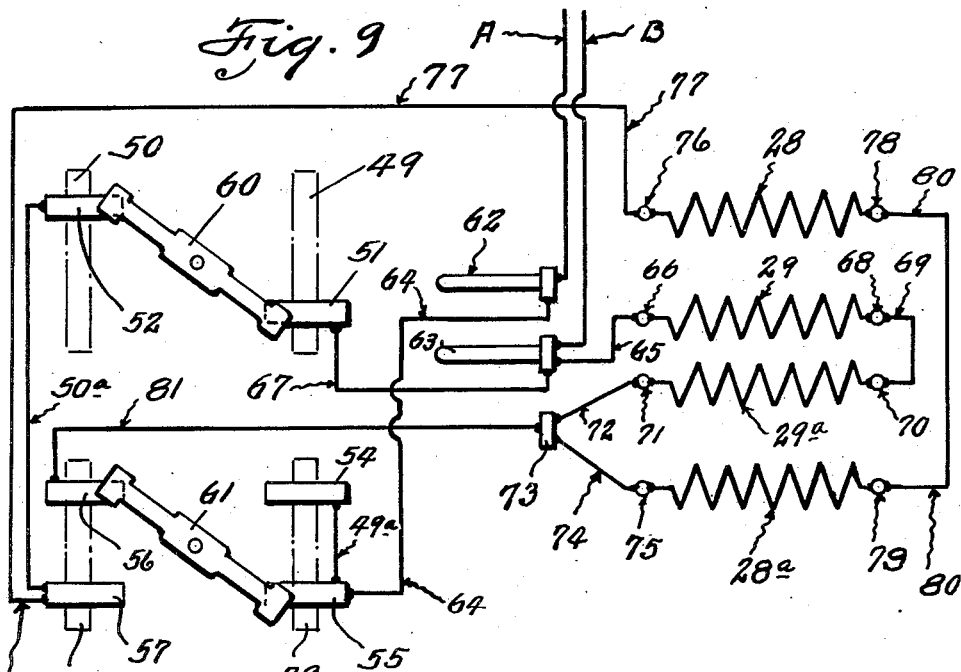
Figure 9 is a diagrammatic view showing the switch in manually set position with the circuits arranged to place the heating elements in parallel with each other.

The present invention consists in arranging the circuits of the heating elements of the toaster in cooperative relation with a suitable switch whereby said heating elements can be connected by means of said switch either in parallel with each other or in series. When connected in parallel, the grids or heating elements receive the full strength of the electric current so as to insure proper toasting operation. When said grids are connected in series, the electric current is reduced so that the heat produced by said grids is greatly reduced and is not sufficient either to toast the bread or to burn or scorch the toast left in the toaster. However this reduced or low heat is sufficient to maintain the toast warm and crisp when left in the toaster.

As disclosed herein, the switch mechanism is arranged so as to maintain the grids or heating elements under normal conditions in series with each other so as to produce low heat. This switch mechanism is manually operable to change the circuit from low heat to high heat, that is, to connect the grids in parallel with each other whereby each grid receives the proper amount of electric current necessary for toasting operation. A timing mechanism is interengaged with the switch mechanism and serves to operate said switch mechanism at an appropriate time so as to change the circuits of the heating elements from parallel to series and change the heat from high to low. Thus the toaster is manually set to start the toasting operation and after a predetermined length of time the switch is automatically operated to reduce the heat sufficiently to stop the toasting operation and maintain the toast merely crisp and warm when left in the toaster and hold the toaster in readiness for the next toasting operation.

The general construction of the toaster disclosed in the present application is substantially the same as that disclosed in co-pending application Serial No. 313,604, filed October 19, 1928, and the present invention is an improvement upon the toaster disclosed in the aforesaid application.

Referring by numerals to the accompanying drawings, 10 indicates a base section on which is detachably mounted a casing section 11 containing the operating parts of the toaster. The base 10 is preferably of rectangular shape having a flat top 10ª and a marginal depending flange 10ᵇ. A series of feet 12 are secured to the underside of the base, preferably to the flange 10ᵇ for supporting said base in spaced relation with the supporting surface, such as a table.

In the instant case, casing 11 is of box-shape, consisting of an outer shell 16 and an inner shell 17 secured together by rivets 18 or in any other suitable manner. The outer shell 16 has solid side walls 16ª, while the end walls 16ᵇ are provided with rectangular openings 16ᶜ open at the bottom. The top wall 16ᵈ of shell 16 is provided with a pair of elongated openings 16ᵉ spaced from and disposed in parallelism with each other.

Shell 17 is of inverted U-shape having a top wall 17ª and end walls 17ᵇ. Top wall 17ª is provided with openings 17ᶜ which coincide with the openings 16ᵉ. The end walls 17ᵇ fit close against the end walls 16ᵇ and are provided with outwardly presented beads 19 which are disposed adjacent to the edges of openings 16ᶜ, thereby rendering said edges inconspicuous. The lower end of one of the end walls 17ᵇ is provided with a pair of spaced depending extensions 20 which are preferably inclined downwardly and outwardly. These extensions are adapted to enter a pair of aligned elongated openings 21 formed in the flat top 10ª near the end thereof.

The lower end of the opposite end wall 17ᵇ is provided with a centrally disposed depending portion 22 having formed in one of its sides a horizontally disposed notch 23. This notched portion 22 is adapted to enter a slot or pin 24 formed in the top 10ª near the opposite end thereof. A latch 25 is pivotally mounted at 26 on the underside of top 10ª and is adapted to be operated to engage the notch 23, thereby locking said notched portion 22 against withdrawal.

A handle 27 is formed on latch 25 to facilitate the manipulation of said latch.

The toaster, as shown, is designed for receiving two slices of bread and is therefore provided with a pair of outer heating elements or grids 28 and 28ª, each of which is disposed adjacent to each side of the toaster with their heating faces presented inwardly and is further provided with a pair of inside or intermediate elements or grids 29 and 29ª arranged with their heating faces in opposed spaced relation with the respective elements 28.

Each heating element, or grid, consists of a sheet of insulating material 30 and a wire or resistance unit 31 anchored in position thereon by suitable means, such as hooks 32. Each sheet 30 is preferably removably arranged in the inner shell 17 in any suitable manner. Guides 34, which are U-shaped, extend vertically through the toaster in spaced relation with the respective heating elements and serve to keep the bread slices in proper spaced relation.

The slices of bread are inserted into the toaster through aligned openings 16ᵉ of the outer shell 16, and 17ᶜ of the inner shell 17, and rest on bread carriers 35. Each of these carriers is mounted between the opposed pairs of heating elements and the corresponding guides 34 and is movable in a vertical plane so as to bring the toasted slices upwardly and expose them through said openings. Said carriers are preferably formed of strips of sheet metal of suitable widths, each strip being formed U-shape to provide a horizontally disposed portion 35$^a$ extending longitudinally of the toaster and upwardly presented ends 35$^b$ which are disposed adjacent to and spaced from the downwardly deflected extensions 16$^f$ formed when openings 16$^e$ are cut in the top wall 16$^b$. One of the ends 35$^b$ of each carrier 35 is disposed inwardly of the corresponding extension 16$^f$ and is rebent downwardly as indicated at 35$^c$ to provide a mount for a horizontally disposed handle bar 36. This handle projects outwardly from the toaster through a slot 37 vertically disposed in the corresponding end wall 17$^b$. The rebent portion 35$^c$ extends a suitable distance below said handle bar and receives extensions 38 of a guide 39, which latter is located exteriorly of the slot 37 in sliding engagement with wall 17$^b$ and serves to hold the carrier in proper position so as to prevent a binding action between said carrier and the respective end wall 17$^b$. The horizontal portion 35$^a$ of each member 35 is preferably provided with a series of openings 40 through which the air is allowed to circulate.

The base 10 has secured to its underside a plate 41 on which is arranged a switch mechanism 42 and a timing mechanism 44.

Switch mechanism 42 has a horizontally disposed handle 45 which projects outwardly through a slot 46 formed in one of the flanges of said base. This handle provides means for manually operating said switch mechanism.

Timing mechanism 44 has an adjusting handle 47 which projects outwardly through a slot 48, also formed in the flange of the base, and is used for adjusting said timing mechanism so as to vary the time interval during which the switch mechanism occupies manually actuated position and the toaster is connected for toasting operation.

Switch mechanism 42 includes blocks 49 and 50 of insulation material and secured to and depending from plate 41. To the upper end of block 49 is secured a stationary contact 51 and to the upper end of block 50 is secured a stationary switch contact 52. These contacts are arranged on the opposite sides so that they are disposed diagonally relatively to each other. The lower end of block 49 carries a pair of spaced switch contact members 54 and 55 and the lower end of block 50 carries a pair of spaced switch contact members 56 and 57. Said contacts are arranged so that contacts 55 and 56, and contacts 54 and 57, respectively, are arranged diagonally relatively to each other. Contacts 54 and 55 are connected together by a wire connection 49$^a$ and contacts 52 and 57, which are arranged on different horizontal planes, are connected together by a diagonally disposed wire connection 50$^a$.

Suitably supported by blocks 49 and 50 is a mounting 58 in which is operatively mounted a snap action actuating means 59 to which said handle 45 is connected. This snap action mechanism carries switch arms 60 and 61 which are insulated from each other and from said mechanism. Said arms are disposed on different horizontal planes, arm 60 being arranged adjacent to base 10 on the same horizontal plane with contacts 51 and 52. This arm 60 is adapted to engage said contacts when in position shown in Figure 9. Arm 61 is arranged below arm 60 and is disposed on the same horizontal plane as the contacts 54, 55, 56 and 57 and is adapted simultaneously to engage each diagonally opposed bar. When in the position shown in Figure 9 it engages contacts 55 and 56.

A pair of terminal pins 62 and 63 is fixed to and projects outwardly from one of the walls of casing 11 and said pins are adapted to receive the plug of an extension cord whereby the toaster can be connected to the supply lines.

Contact 55 is connected by a wire connection 64 to pin 62 while the other pin 63 has connected thereto, by a wire connection 65, terminal 66 of the inner heating element or grid 29 and is also connected by a connection 67 to switch contact 51. The other terminal 68 of element 29 is connected by a connection 69 to a corresponding terminal 70 of the heating element 29$^a$. Terminal 71 of this element 29$^a$ is connected by a wire 72 to a binding post 73 to which is also connected, by a wire 74, terminal 75 of element 28$^a$. The corresponding terminal 76 of element 28 is connected by a wire 77 to switch contact 57. The other terminal 78 of element 28 and terminal 79 of element 28$^a$ are connected together by a connection 80. Binding post 73 is connected by a wire 81 to switch contact 56.

Thus it will be seen that the outer pair of heating elements 28 and 28$^a$ are connected in series with each other by connection 80 and that the inner pair of heating elements 29 and 29$^a$ are connected in series with each other by connection 69.

It will be also observed that the terminals 71 and 75 of elements 29$^a$ and 28$^a$, respectively, are connected to binding post 73 which in turn is connected by wire 81 to contact 56. The terminal 66 of element 29 is connected to terminal pin 63 and then through connection 67 to switch contact 51. Terminal 76 of element 28 is connected by wire 77 to switch contact 57 and by wire 50$^a$ also to contact 52.

Terminal pin 62 is connected by wire 64 to switch contact 55 and also by connection 49ᵃ to switch contact 54.

The switch mechanism 42 is operated manually by handle 45 to bring the arms 60 and 61 in positions shown in Figure 9 wherein arm 60 is in engagement with contacts 51 and 52 and completes the circuit between pin 63 and terminal 76 of elements 28 (63 to 67, 51, 60, 52, 50ᵃ, 57, 77, and then to 76) so that electric current can travel from said terminal pin 63 through elements 28 and 28ᵃ independently of, or in parallel with, elements 29 and 29ᵃ.

In this position arm 61 is in engagement with contacts 55 and 56 and completes the circuit between the binding post 73 and terminal pin 62 (73 to 81, 56, 61, 55, 64, and then to 62).

Terminal 66 is directly connected by connection 65 to terminal pin 63 whereby elements 29 and 29ᵃ are supplied with electric current by the completion of circuits by arms 60 and 61 as shown in Figure 9. Thus the series connected elements 29 and 29ᵃ are connected to the supply lines in parallel with the elements 28 and 28ᵃ and all of said elements receive electric current of proper strength necessary for the toasting operation.

Timing mechanism 44 includes suitable clockwork 82, the main stem 84 of which has fixed thereon a segment 85 having a raised portion 85ᵃ and a shoulder 85ᵇ. A horizontally disposed arm 86 is pivotally mounted on said stem intermediate its ends above segment 85 and has one end 86ᵃ provided with a vertically disposed pin 87 on which is pivotally mounted a pawl 88. The free or hook end 88ᵃ of said pawl is urged against the edge of said segment 85 by spring 89. Thus the hook end of the pawl is adapted, when arm 86 is actuated into position shown in Figure 3, to drop behind the shoulder 85ᵇ of segment 85 and establish operative connection between the clockwork 82 and said arm 86.

Figure 10:
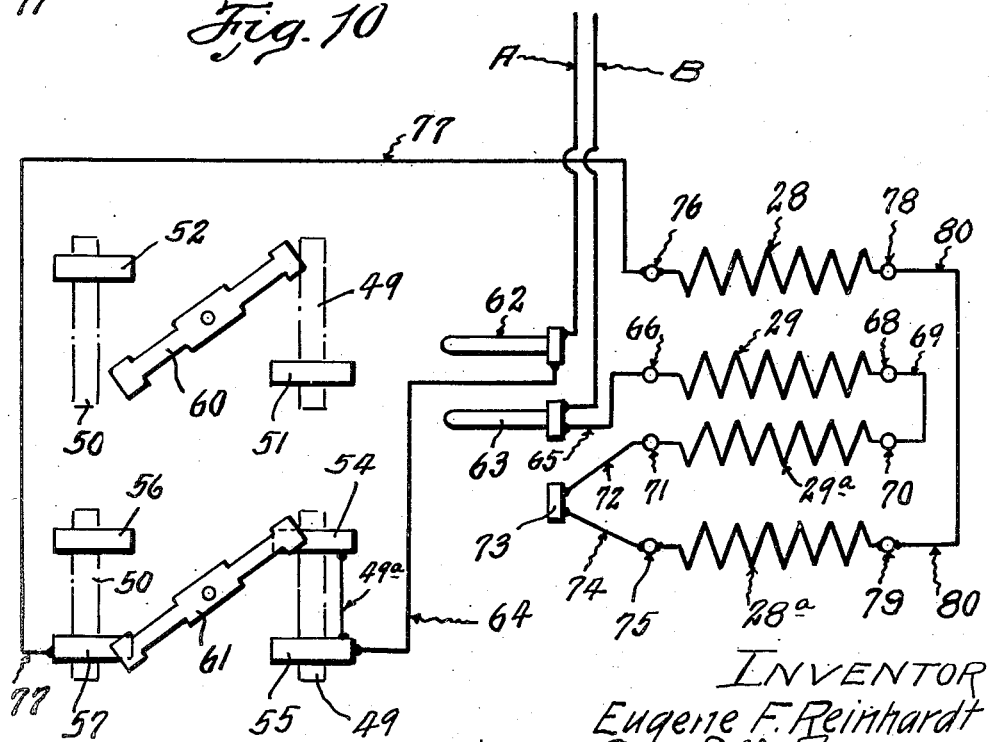
Figure 10 is a diagrammatic view showing the switch in released position and showing the circuits arranged with the heating elements in series with each other.

The opposite end 86ᵇ of said arm 86 has pivotally connected to it one end of a connecting link 90, the other end of which is pivotally connected to handle 45. A coiled spring 91 is connected at one end to said handle 45, as at 92, and is stationarily anchored at the other end as indicated at 93. This spring has tendency to hold arm 45 in position shown in Figure 4 in which position the switch mechanism and the arms 60 and 61 are arranged as shown in Figure 10. However, said arm 45 and the switch mechanism are locked against movement to normal position by the interengagement of pawl 88 with segment 85.

The free or hook end 88ᵃ of pawl 88 has an upwardly projecting pin 95 which is adapted to be engaged by the eccentrically disposed edge 96 of arm 97. The latter is mounted concentrically with stem 84 and is frictionally held in position. Adjusting handle 47 is formed integral with said arm and serves to adjust the latter relatively to pin 95. The contour of the edge of arm 97 is such that when pawl 88 rests against the raised edge 85ᵃ of segment 85 (see Figure 4) pin 95 is disposed in a path outside of said eccentric portion 96 and is not affected thereby. When, however, the hook end 88ᵃ drops behind shoulder 85ᵇ, pin 95 is brought within the range of the eccentric edge 96 and as the pin 95 travels during the actuation of the clockwork in the direction indicated by arrow (see Figures 3 and 6), that is, toward arm 97, said pin is caused to ride upon the concentric edge 96, thereby rocking said pawl on its pivot and causing the hook 88ᵃ to become disengaged from shoulder 85ᵇ. This disengagement of pawl 88 from segment 85 releases arm 86 from the clockwork and allows the handle 45 and the switch mechanism 42 to be restored, under the influence of spring 91, to normal or home position as shown in Figure 4. This actuation of the switch mechanism causes arms 60 and 61 to move from the position shown in Figure 9 to normal or home position shown in Figure 10.

In this position arm 60 is disengaged from contacts 51 and 52 so that the connections connected to said contacts are rendered inactive.

Arm 61 is moved from engagement with contacts 55 and 56 and engages contacts 54 and 57. Thus the connection 81 connecting the contact 56 with binding post 73 is cut out of the circuit and a new circuit is established whereby the pair of elements 28 and 28ᵃ are placed in series with elements 29 and 29ᵃ.

In this circuit the terminal pin 62 is connected by connection 64, contact 55, and connection 49ᵃ to contact 54, and then by arm 61, contact 57, and connection 77 to the terminal 76 of element 28. Element 28ᵃ is connected by binding post 73 to terminal 71 of elements 29ᵃ and element 29 is connected by connection 65 to terminal pin 63.

The resistance of each pair of heating elements 29—29ᵃ, and 28—28ᵃ, is so arranged that the electric current supplied by the main lines A and B to terminal pins 62 and 63 and then to each pair of said heating elements when connected in parallel, is sufficient to produce the high heat necessary for the toasting operation. Consequently when said pairs are placed in series with each other the amount of electric current suplied to each heating element is cut down whereby the heat is considerably reduced due to the increased resistance, with the result that only sufficient heat is produced to keep the toaster warm only. When the toast is left in the toaster after the toasting operation, this slow heat will keep the toast warm and crisp but will not burn such toast.

This feature greatly increases the usefulness of the toaster as it provides toast which is more appetizing and which can be served at any time.

In the operation of the toaster, the electric circuit is closed as soon as the main lines are connected to the terminal pins 62 and 63 and the heating elements of the toaster remain energized during the entire period of the connection of the toaster to the main lines. The change in the heat, or toasting and warming operations of the toaster, is effected by changes in the circuits of the heating elements without the use of extraneous resistance or devices and the flow of the electric current remains uninterrupted as long as the main lines are connected to the terminal pins.

To start the toasting operation it is necessary to operate manually handle 45. The timing mechanism 44 releases the handle and restores the series circuit after the parallel circuit, or the toasting operation, has been in operation for a definite length of time. This time interval can be regulated by adjusting handle 47.

I claim:

1. In an electric toaster, the combination of a support, a plurality of heating elements arranged in said support in parallel spaced relation, there being a pair of outer series connected elements and a pair of inner series connected elements, a pair of terminal posts fixed in said support and adapted to be connected to the main lines, a pair of switch arms oscillatably mounted on said support in spaced relation with each other, a coiled spring operatively associated with said switch arms for yieldably maintaining them in one position, a manually operable lever associated with said switch arms for operating them in an opposite direction, means for locking said switch arms in manually-operated position, clock mechanism operatively associated with said locking mechanism for releasing the latter at a predetermined time whereby said switch arms are returned to normal position by said spring, a pair of contacts engageable by the first switch arm when the latter is actuated by said manual lever; a second set of contacts consisting of two pairs of contacts engageable by the second contact arm, the first pair of contacts of said second set being connected, respectively, to one of said terminal posts and to a terminal of one of said outer elements; the terminal of the adjacent inner element being connected to the other terminal post, and the terminals of the other two inner and outer elements being connected together; whereby when said switch arms occupy normal or spring-actuated positions the first contact arm is disengaged from its respective contacts and the second contact arm is in engagement with the first pair of contacts of said second set, whereby said outer and inner heating elements are connected in series with each other and provide low heat; the second pair of contacts of said second set being connected, respectively, to the first terminal post and to the interconnected terminals of the last-mentioned inner and outer elements; whereby when said switch contacts occupy manually operated position said outer and inner elements are connected in parallel with each other and provide toasting heat.

2. In an electric toaster, the combination of a support, a plurality of heating elements arranged in said support in parallel spaced relation, there being a pair of outer series connected elements and a pair of inner elements, a pair of terminal posts fixed in said support and adapted to be connected to the main lines, a pair of switch arms oscillatably mounted on said support in spaced relation with each other, a coiled spring operatively associated with said switch arms for yieldably maintaining them in one position, a manually operable lever associated with said switch arms for operating them in a direction opposed to said spring, means for locking said switch arms in manually-operated position, clock mechanism operatively associated with said locking mechanism for releasing the latter at a predetermined time whereby said switch arms are returned to normal position by said spring, a pair of contacts arranged in a plane of travel of one of said switch arms and engageable by it only when the latter is actuated in one direction by said manual lever; a second set of contacts consisting of two pairs of contacts arranged in a plane of movement of the second contact arm, the first pair of contacts of said second set being connected, respectively, to one of said terminal posts and to a terminal of one of said outer elements; the corresponding terminal of the adjacent inner element being connected to the other terminal post, and the other terminals of the two remaining inner and outer elements being connected together, whereby when said switch arms occupy normal or spring-actuated positions the first contact arm is disengaged from its respective contacts and the second contact arm is in engagement with said first pair of contacts whereby said outer and inner heating elements are connected in series with each other and provide low heat, the second pair of contacts of the second set being connected, respectively, to the first terminal post and to the interconnected terminals of the last-mentioned inner and outer elements, whereby when said switch arms occupy manually operated positions said outer and inner elements are connected in parallel with each other and provide toasting heat, and a manually operable lever associated with said locking means for adjusting the time interval of the release thereof by said clock mechanism.

3. In an electric toaster, the combination of a support, a plurality of heating elements arranged in two pairs, one pair being connected in series to provide outer elements and the other pair being connected in series to provide inner elements, a pair of terminal posts adapted to be connected to main supply lines, one of said terminal posts being connected to one terminal of the first inner element, a switch mechanism including a pair of oscillatable contact arms arranged in spaced relation with each other and operating in unison, a coiled spring associated with said arms for yieldably holding them in normal or "series" position, a manually operable lever associated with said switch arms and moving the latter in opposite or "parallel" position against the influence of said spring, a first set of contacts cooperating with one of said arms when the latter occupies "parallel" position, one of said contacts being connected to the first mentioned terminal post and to the corresponding terminal of said first inner heating element, the other contact being connected to one terminal of the corresponding outer element, a second set of stationary contacts cooperating with the second contact arm and including a first pair of contacts, one of which is connected to the second terminal post and the other of which is connected to the interconnected terminals of the other two cooperating inner and outer heating elements whereby when said switch arms occupy manually operated or "parallel" position said outer and inner elements are connected in parallel; the second pair of contacts of said second set being connected, respectively, to said second terminal post and to said terminal of the first outer element whereby when said switch arms occupy normal or "series" position the first contact arm is disengaged and said second contact arm is engaged with said second pair of contacts and said outer and inner heating elements are connected in series with each other to provide low heat, locking means cooperating with said manual lever for locking said switch arms in manually operated or "parallel" position, and clockwork mechanism associated with said locking means for releasing the latter and restoring said contact arms to normal or "series" position after a predetermined length of time.

4. In an electric toaster, the combination of a support, a plurality of heating elements arranged in two pairs, one pair being connected in series to provide outer elements and the other pair being connected in series to provide inner elements, a pair of terminal posts adapted to be connected to main supply lines, one of said terminal posts being connected to one terminal of one of said inner elements, a switch mechanism including a pair of oscillatable contact arms arranged in spaced relation with each other and operating in unison, a coiled spring associated with said arms for yieldably holding them in normal or "series" position, a manually operable lever associated with said switch arms and moving the latter in opposite or "parallel" position against the influence of said spring, a first set of contacts cooperating with one of said arms when the latter occupies "parallel" position, one of said contacts being connected to the first mentioned terminal post and to the corresponding terminal of the first inner heating element, the other contact being connected to the terminal of the corresponding outer element, a second set of stationary contacts cooperating with the second contact arm and including a first pair of contacts, one contact of which is connected to the second terminal post and the interconnected terminals of the other two cooperating inner and outer heating elements whereby when said switch arms occupy manually operated or "parallel" positions said pairs of heating elements are connected in parallel; the second pair of contacts of said second set being connected, respectively, to said second terminal post and to said terminal of the first outer element whereby when said switch arms occupy normal or "series" position, the first contact arm is disengaged and said second contact arm is engaged with said second pair of contacts and said outer and inner heating elements are connected in series with each other to provide low heat, locking means cooperating with said manual lever for locking said switch arms in manually operated or "parallel" position, clockwork mechanism associated with said locking means for releasing the latter and restoring said contact arms to normal or "series" position after a predetermined length of time, and a manually operable member associated with said locking means for regulating the release thereof by said clockwork mechanism.

In testimony whereof I hereunto affix my signature this 17th day of September, 1929.

EUGENE F. REINHARDT.